(12) United States Patent
Wu et al.

(10) Patent No.: US 6,542,653 B2
(45) Date of Patent: Apr. 1, 2003

(54) LATCHING MECHANISM FOR OPTICAL SWITCHES

(75) Inventors: Shuyun Wu, Arcadia, CA (US); Brent E. Burns, Rancho Palos Verdes, CA (US)

(73) Assignee: Integrated Micromachines, Inc., Monrovia, CA (US)

( * ) Notice: Subject to any disclaimer, the term of this patent is extended or adjusted under 35 U.S.C. 154(b) by 0 days.

(21) Appl. No.: 09/805,306

(22) Filed: Mar. 12, 2001

(65) Prior Publication Data

US 2002/0126947 A1 Sep. 12, 2002

(51) Int. Cl.$^7$ ................................................ G02B 6/35
(52) U.S. Cl. .............................. 385/16; 385/15; 385/18
(58) Field of Search .............................. 385/16, 17, 18, 385/15

(56) References Cited

U.S. PATENT DOCUMENTS

| | | | | |
|---|---|---|---|---|
| 5,757,991 A | * | 5/1998 | Harman | 385/16 |
| 2001/0051014 A1 | * | 12/2001 | Behin et al. | 385/16 |
| 2002/0031294 A1 | * | 3/2002 | Takeda et al. | 385/16 |

* cited by examiner

*Primary Examiner*—Lynn Field
*Assistant Examiner*—Michael C. Zarroli
(74) *Attorney, Agent, or Firm*—Liu & Liu

(57) ABSTRACT

The present invention is directed to a micro-switch assembly involving a magnetic latching mechanism. In one aspect of the present invention, it involves a micromachined structure that comprises an outer frame, an inner frame pivotally connected to the outer frame and rotates when an external electromagnetic force is applied, and a mechanism for latching the inner frame at a given angle of inclination relative to the outer frame. One embodiment of the present invention involves the use of a magnetic material, such as Permalloy, and permanent magnets to achieve the latching result. A Permalloy piece is attached to the inner frame of the micro-switch assembly and a magnet layer is attached to the outer frame. The magnetic force attracting the Permalloy piece and the magnet layer allows the latching of the two frames to occur in the absence of the external applied electromagnetic force. The use of this magnetic latching mechanism allows a reduction in the use of electric current to maintain a movable frame in a micromachined structure or a micro-switch assembly in a fixed position. It provides greater mechanical and optical stability and less energy consumption. In other embodiments, additional Permalloy pieces can be added to the outer frame to increase the magnetic field, so as to further reduce the electric current necessary for latching and unlatching the frames.

6 Claims, 17 Drawing Sheets

LATCHING MECHANISM FOR OPTICAL SWITCHES

BACKGROUND OF THE INVENTION

1. Field of the Invention

The present invention relates to a micromachined structure and to an opto-mechanical switch (micro-switch) incorporating the micromachined structure. Specifically, it relates to a latching mechanism incorporated in the opto-mechanical micromachined switch.

2. Description of Related Art

Micromachines are small electromechanical devices that are fabricated on wafers of silicon and other materials using semiconductor manufacturing techniques. Optical switches in micro-electromechanical systems (MEMS) employ tiny mirrors that are etched onto silicon wafers. Such optical switches are commonly used in fiber-optic networks, through which light signals/data are routed. The tiny mirrors can be positioned to intercept the incoming light signals conveyed via the individual strands of optical fiber. Or alternatively, the mirrors can be pivoted to direct the incoming light beam at a desired angle into a receiving fiber.

Opto-mechanical switches typically include a light source, a light receiver, and a movable light blocking/reflecting mechanism. The light blocking/reflecting mechanism typically includes a drive motor that is selectively actuated to move a blocking/reflecting member (e.g., a mirror) between or among different positions, thereby performing the micro-switch function.

Typically, an electromagnetic drive motor is used to turn on/off the micro-switch by moving the mirror. In the past, to maintain the switch in the "on" position, current must be applied continuously to maintain the electromagnetic force on the mirror. The continuously applied current inherently generates excess heat, which is dissipated to the neighboring structure, which is undesirable for a micro-electromechanical system. Among other things, this heat can cause the reflective surface and supporting structure to change shape and size, thereby increasing mechanical and optical instability. Besides, continuous application of electric current also results in high-energy consumption. This heating problem is exacerbated when a large number of micro-switches are used in a large array for switching in an optical network. It is therefore desirable to provide an opto-mechanical micromachined micro-switch that avoids the heating problems associated with the continuous application of electric current.

SUMMARY OF THE INVENTION

To overcome the shortcomings of existing optical switches described above, the present invention relates to an opto-mechanical micro-switch assembly that is more efficient, more mechanically and optically stable, and consumes less energy. Specifically, this invention relates to a novel magnetic latching mechanism for the mirror in the micro-switch. The present invention also relates to a method of operating the opto-mechanical micro-switch assembly.

According to one embodiment of the present invention, the overall assembly of a micromachined switch consists of an inner frame pivotally connected to an outer frame formed from a monocrystalline silicon substrate via torsion beams. The structure of the inner frame includes a light-reflecting (mirror) surface. A current can be applied to coils that are attached to the inner frame. Permanent magnets are attached onto the outer frame. Because of the interaction of the current and the magnetic field of the permanent magnets, an electromagnetic force causes the inner frame, and thereby the mirror, to pivot about the beams. When the mirror rotates to a certain position, the mirror surface intercepts (blocks or reflects) light transmitted via fiber optic networks. It is often required to maintain the mirror at such positions for a length of time during the operation of the micro-switch. The present invention provides a novel mechanism for latching the mirror for such purpose.

According to one embodiment of the present invention, a piece of magnetic material (e.g., PERMALLOY™ magnetic material, hereinafter referred to in short as "Permalloy") is attached to the lower portion of the moving/rotatable inner frame. The outer frame consists of layers of a silicon substrate, a permanent magnet, and a nickel/iron base. These layers are etched onto each other using prevailing art of micromachining. Upon applying an initial electro-magnetic force to rotate the inner frame past a threshold, the Permalloy piece is brought closer to the permanent magnet layer. Due to the attraction between the Permalloy piece on the inner frame and the permanent magnet layer in the outer frame, the inner frame of the opto-mechanical micro-switch can be latched onto the outer frame without continuous application of electric current to maintain electro-magnetic force to keep the inner frame in the rotated position.

In another embodiment of the present invention, a Permalloy piece is attached to the permanent magnet layer in the outer frame to focus the magnetic field at the Permalloy piece on the inner frame. During pivotal movements, the Permalloy piece already attached to the inner frame will be drawn to the Permalloy piece on the outer frame. The addition of the Permalloy piece on the outer frame increases the effective magnetic force, which attracts and holds the two Permalloy pieces in a latched-on position.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIG. 10 is a sectional view of the opto-mechanical micro-switch of FIG. 3 at the "switch starts off" stage with latch on.

DETAILED DESCRIPTION OF THE PREFERRED EMBODIMENT

This invention is described in a preferred embodiment in the following description with reference to the drawings. While this invention is described in terms of the best mode for achieving this invention's objectives, it will be appreciated by those skilled in the art that variations may be accomplished in view of these teachings without deviating from the spirit or scope of the invention. This description is made for the purpose of illustrating the general principles of the invention and should not be taken in a limiting sense. The scope of the invention is best determined by reference to the appended claims.

An opto-mechanical micromachined switch is described in U.S. patent application Ser. No. 09/366,428 filed Aug. 2, 1999, assigned to Integrated Micromachines, Inc., the assignee of the present invention. That application is fully incorporated by reference herein.

Figure 1:
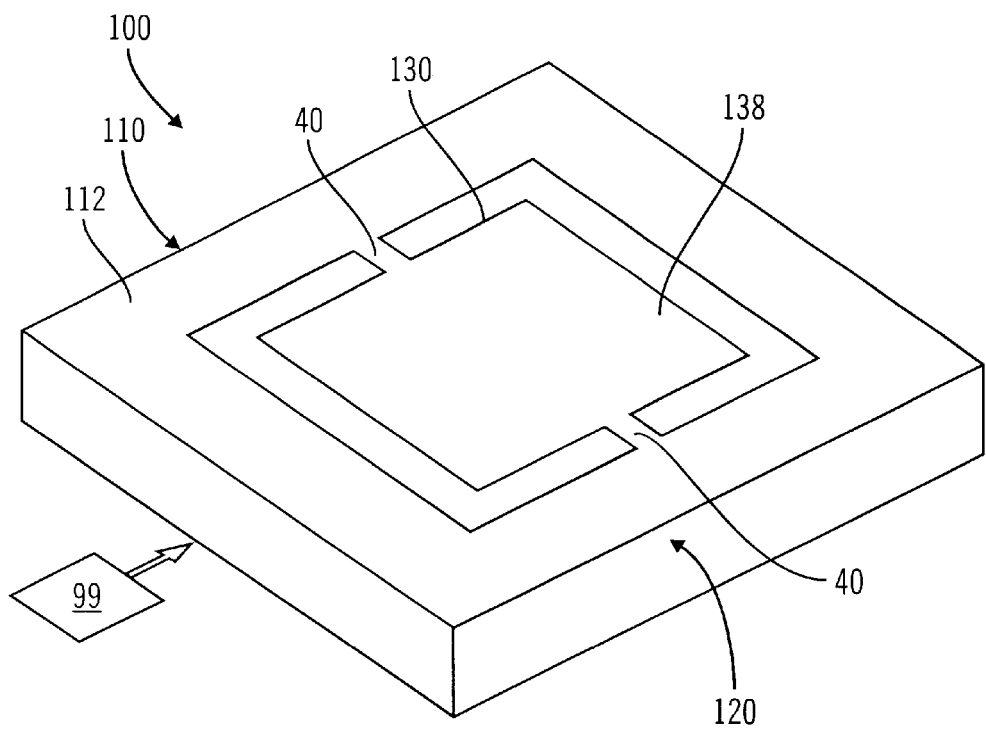
FIG. 1 is a perspective view showing a micromachined micro-switch structure in accordance with one embodiment of the invention.

An opto-mechanical micro-switch, according to one embodiment of the present invention, comprises a micromachined structure that is formed from a monocrystalline silicon substrate. Referring now to FIG. 1, there is shown a perspective view of the overall assembly of such micromachined structure 100, which is formed from a monocrystalline silicon substrate 110 having an upper surface 112 that lies in the {100} plane of monocrystalline silicon substrate 110. The single crystal structure of monocrystalline silicon substrate 110 is recommended because it provides mechanical advantages, such as superior stiffness, durability, fatigue and deformation characteristics. In addition, monocrystalline silicon substrates are relatively inexpensive and readily available. Further, batch fabrication techniques using monocrystalline silicon are well established. Monocrystalline silicon substrate 110 can be economically micromachined to form relatively defect-free micromachined structure 100. In other embodiments, substrate 110 may be formed using other materials.

Micromachined structure 100 includes an outer frame 120 and an inner frame 130. Inner frame 130 is pivotally connected to outer frame 120 by beams 40. A controller 99 is configured to apply an external force to rotate the inner frame 130 about beams 40. Inner frame 130 has outward-facing flat surface 138. As described below, outward-facing flat surface 138 is utilized as a light reflecting/blocking surface that either reflects an incident light beam (i.e., when a light reflecting (mirror) material is deposited on the surface 138), or blocks the incident light beam (e.g., when the surface 138 is partially or fully opaque).

Figure 2:
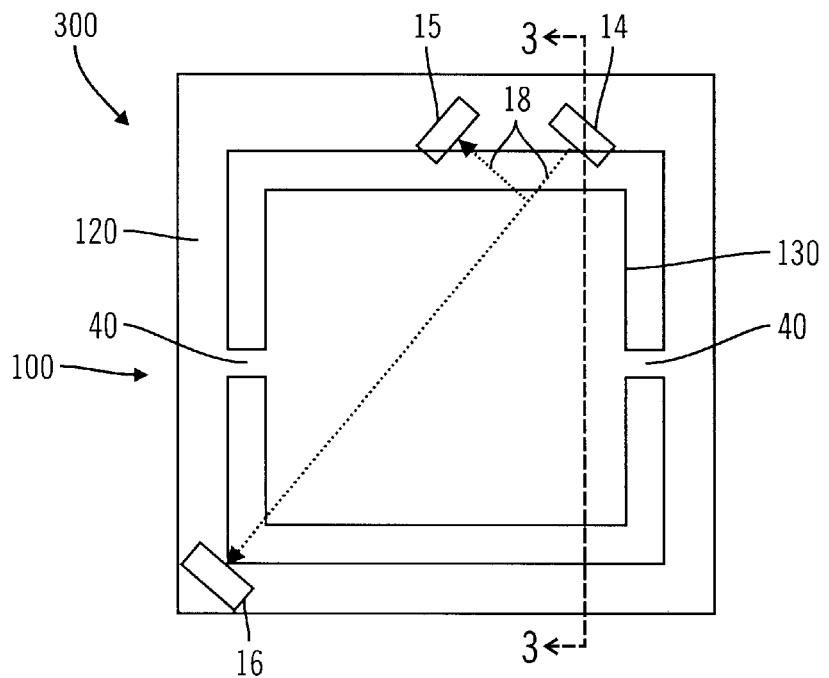
FIG. 2 is a plan view of the opto-mechanical micro-switch of FIG. 1 in relation to light source and detectors.

FIG. 2 is a plan view showing an opto-mechanical micro-switch 300 incorporating the micromachined structure 100 (shown in FIG. 1) and the relationship to light source and sensors in accordance with one embodiment of the present invention. In FIG. 2 the opto-mechanical micro-switch 300 includes a light source 14, a first light receiver 15, a second light receiver 16, and micromachined structure 100, which is located adjacent to light source 14 and light receivers 15 and 16. As indicated above, micromachined structure 100 includes an outer frame 120 and an inner frame 130 that is surrounded by and pivotally connected to the outer frame 120. Inner frame 130 includes an outward-facing flat surface 138 that is used to selectively reflect a light beam 18 from light source 14 to first light receiver 15. In the embodiment shown, the planar size of the inner frame 130 is on the order of 2 mm×2 mm.

Although a single opto-mechanical micro-switch 300 is shown in FIG. 2, the methods and structure of the present invention may be utilized to produce a multi-switch device including an array of multiple micromachined structures 100 formed on a single substrate. Because micromachined structure 100 is formed using a batch process, multiple interacting micro-switches may be formed during the same fabrication process, thereby providing alignment of multiple mirror surfaces to produce a multi-switch arrangement. In addition, to manufacture the micromachined structure 100 and the micro-switch 300, etch-stop diffusion, silicon nitride deposition, Permalloy formation, anisotropic etching, frame separation, metallization can be performed using the manufacturing techniques disclosed in U.S. patent application Ser. No. 09/366,428 filed Aug. 2, 1999, assigned to Integrated Micromachines, Inc., the assignee of the present invention.

Figure 3:
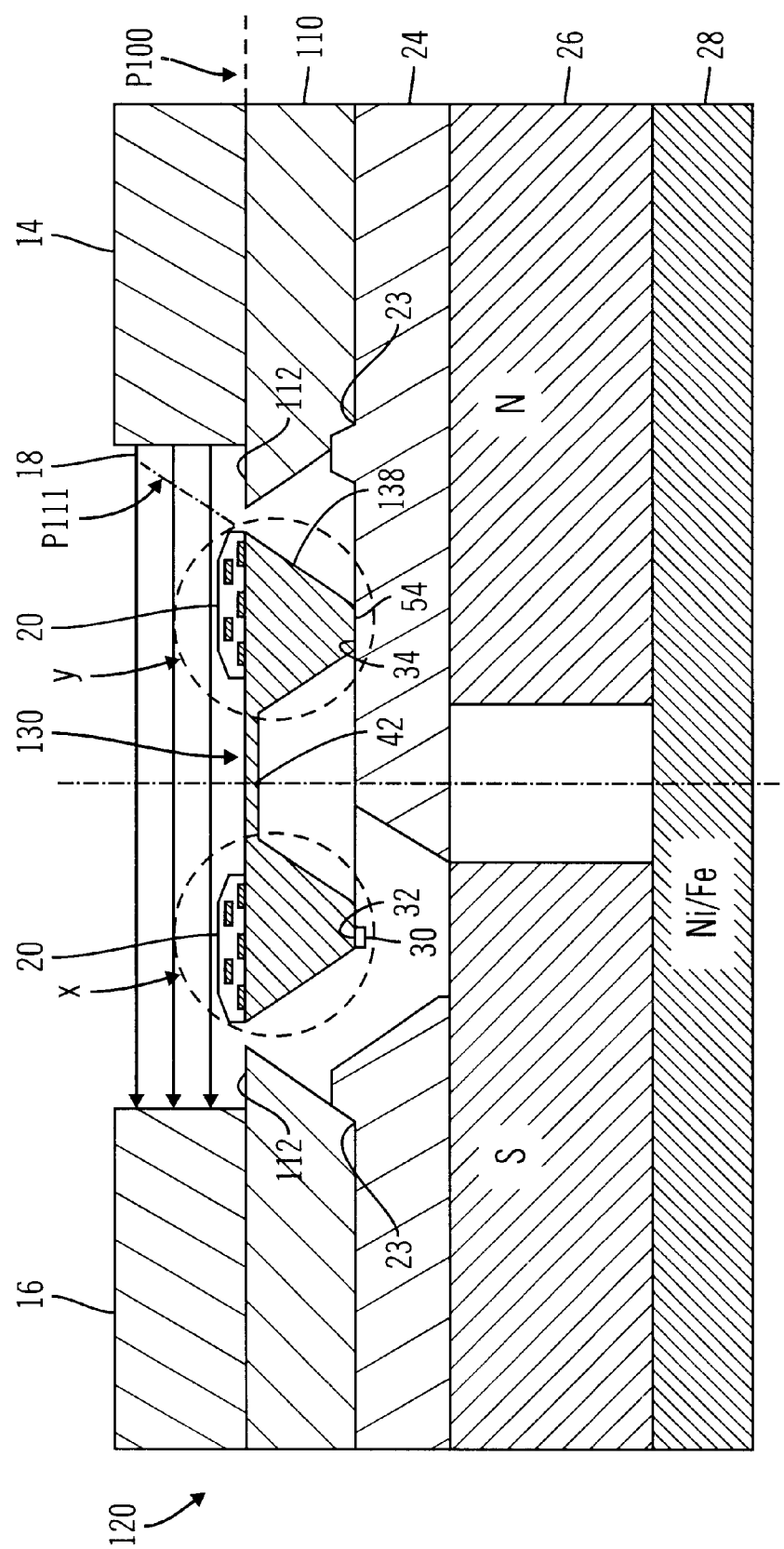
FIG. 3 is a sectional view of the opto-mechanical micro-switch taken along line 3—3 in FIG. 2 at the "switch off" stage.
Figure 5:
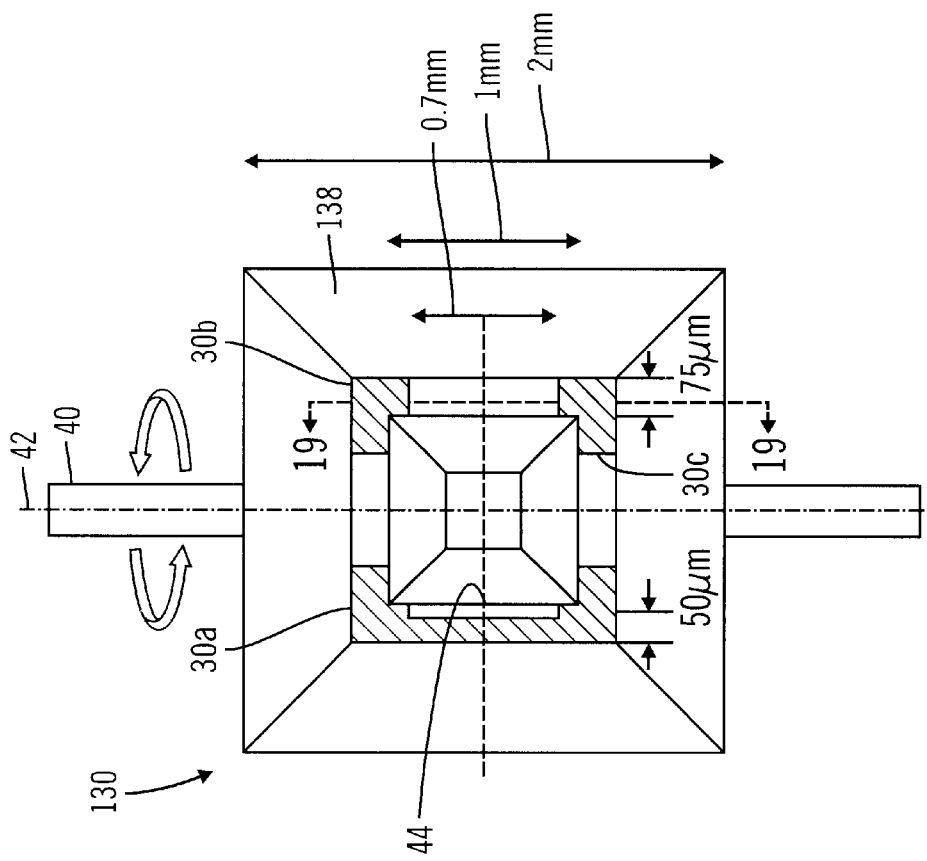
FIG. 5 is a plan bottom view of the inner frame in FIG. 3 showing another embodiment of the present invention with Permalloys.
Figure 4:
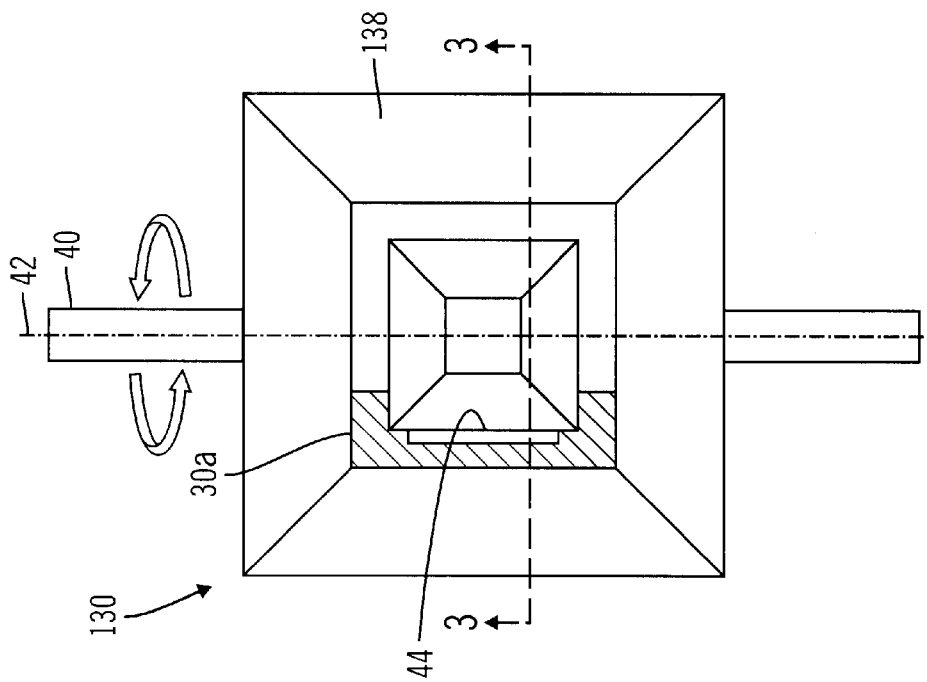
FIG. 4 is a plan bottom view of the inner frame in FIG. 3 showing one embodiment of the present invention with Permalloys.

One aspect of the present invention is shown in FIGS. 3–5. FIG. 3 is a sectional view, taken along line 3—3 in FIGS. 2 and 4, of opto-mechanical micro-switch incorporating an embodiment of the present invention. In FIG. 3, the micro-switch is in its "switch off" position. The {100} plane of monocrystalline silicon substrate 110 defines upper surface 112. The {111} plane of monocrystalline silicon substrate 110 defines the outward-facing flat surface 138 of the inner frame 130. As is characteristic of a single silicon crystal, the {100} plane (indicated as horizontal plane P100) intersects the {111} plane (indicated as plane P111) at an angle α equal to 54.7°.

The monocrystalline silicon substrate is formed such that the upper and lower surfaces lie in {100} planes of the substrate. The anisotropic etchant stops at the {111} plane of the monocrystalline silicon substrate, thereby producing the flat wall at a known angle relative to the upper and lower surfaces of the substrate. In the KOH etching process, a notch 23 is formed by etching along the {111} crystal plane of the silicon substrate layer 24 so that it can be aligned with the etched {111} plane of the substrate 110 above it. The notch 23 is a recess that allows the layer of substrate 110 to align accurately onto the layer of substrate 24. The angle of the KOH etched plane is about 54.7° to the {100} plane of the substrate 24.

Figure 8:
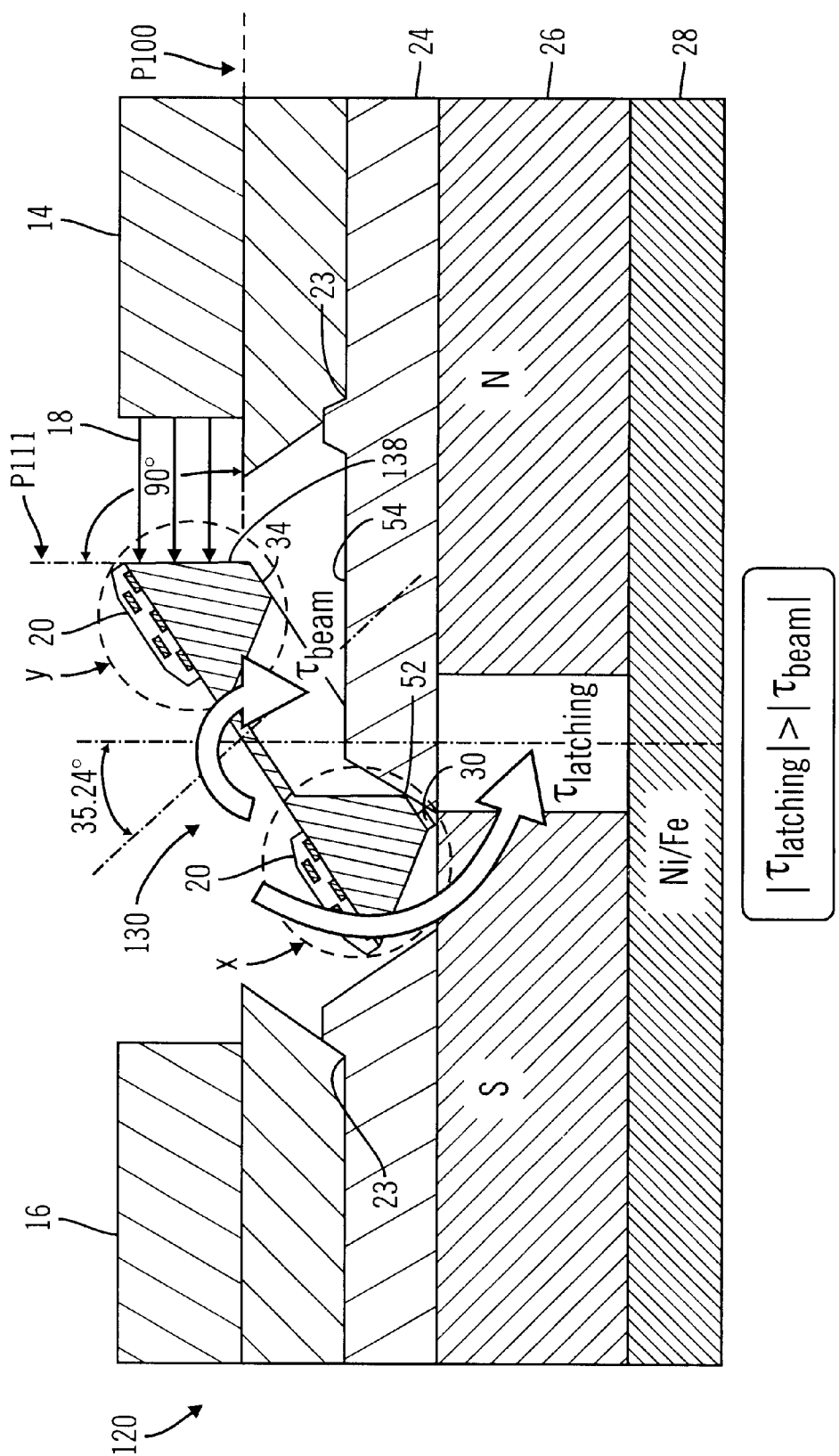
FIG. 8 is a sectional view of the opto-mechanical micro-switch of FIG. 3 at the "switch-on" stage.

When the inner frame 130 is rotated a predetermined amount relative to the outer frame 120, the outward-facing flat surface 138 is rotated into a raised position to selectively obstruct or reflect light passing from the light source 14 to the light receiver 15/16 of the opto-mechanical micro-switch 300. This is known as the "switch-on" position and is shown in FIG. 8.

In accordance with one embodiment of the present invention, the method of operating the micro-switch is provided below. Actuation of micromachined structure 100 in the opto-mechanical micro-switch 300 arrangement requires the application of a force (e.g., electromagnetic) to inner frame 130 that causes pivoting or rotation of inner frame 130 relative to outer frame 120 around beam 40 (see FIGS. 4 and 5) about the axis of rotation 42. Inner frame 130 is selectively pivoted into a position in which the plane of the light reflecting/blocking, outward facing flat surface 138 is perpendicular to upper surface 112 as shown in FIG. 8. In this manner, the opto-mechanical micro-switch 300 operates by pivoting from a first position shown in FIG. 3, in which end Y is located at or below plane P 100 defined by upper surface 112 (i.e., the "switch-off" position), to the upright (second) position shown in FIG. 8, in which the plane P111 defining surface 138 intersects the plane P100 of substrate 110 at an angle of approximately 90° (i.e., the "switch-on" position). As indicated in FIG. 3, when inner frame 130 is in the "switch-off" position, light beam 18 is transmitted across micromachined structure 100 from light source 14 to light receiver 16, thereby indicating a first switch state. However, as shown in FIG. 2, when the inner frame rotates upward, light beam 18 is reflected by outward-facing flat surface 138 back to the light receiver 15 or blocked altogether (not shown in figures), thereby indicating an alternate switch state.

It is noted that the terms "switch-on" and "switch-off" are referenced arbitrarily relative to two states of the switch. The "on" and "off" states of the switch may be interchanged between FIG. 3 and FIG. 8 without departing from the scope and spirit of the invention.

In one embodiment, a magnetic material such as a Ni—Fe material commercially available under the trademark Permalloy is provided on the inner frame 130, so that the inner frame can be latched onto the outer frame 120, without continuous application of electric current through coils attached to the inner frame 130. The electromagnetic force can be applied through an external structure, mounted in close proximity to micromachined structure 100 on a hybrid substrate, or integrated onto micromachined structure 100.

As indicated in FIG. 3, a Permalloy piece 30 on the inner frame and a permanent magnet layer 26 in the outer frame are arranged to maintain latching after pivoting/rotation. The Permalloy piece 30 is attached to the downward movable portion 32 at end X of inner frame 130. The magnet 26 lies between the silicon substrate layer 24 and the nickel/iron layer 28.

Figure 19:
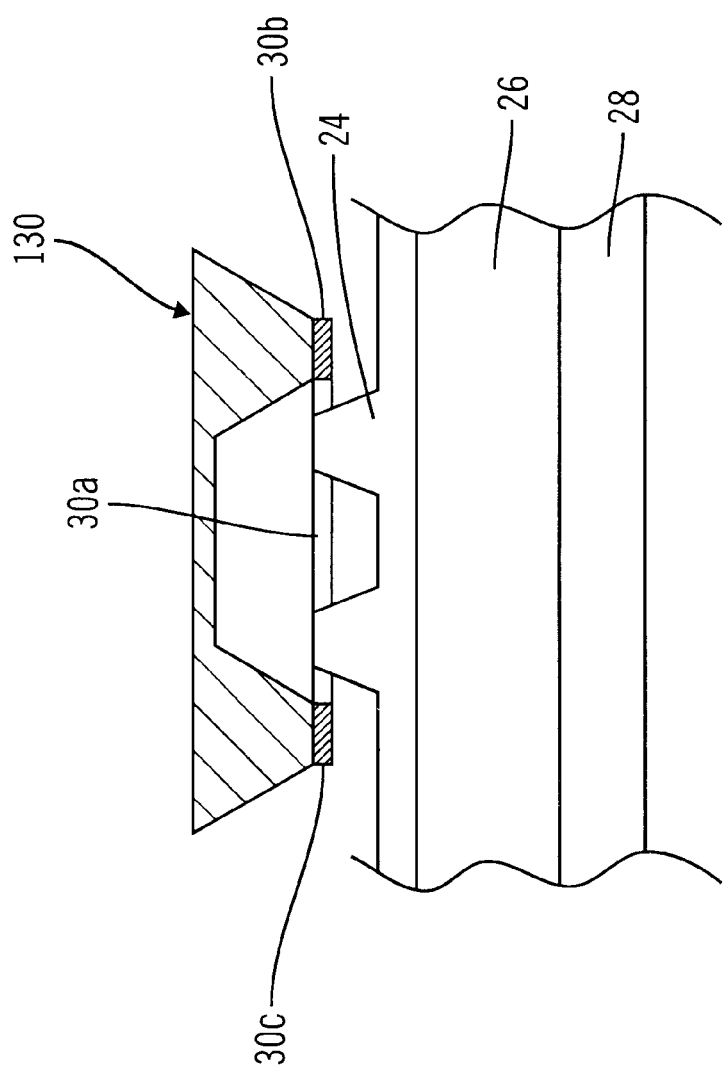
FIG. 19 is a cross-sectional view taken along line 19—19 in FIG. 5 of the inner frame with the substrate of the outer frame.

FIG. 19 shows the cross-sectional view of the inner frame 130 along line 19—19 in FIG. 5 with reference to the outer frame. As seen in these two figures, the inner frame 130 has permalloys 30b and 30c that do not contact the substrate 24. The width of the substrate 24 in FIG. 19 does not extend to contact the permalloys 30b and 30c that are suspended in the air without supports below them. The substrate 24 has minimal contact area with the inner frame 130 to reduce stiction. This configuration can also be applied to the Permalloy configuration shown in FIG. 14.

As indicated above, FIG. 3 shows the initial position, or the first switch state or the "switch off" state. At this "switch-off" state, end Y remains at or below plane P100 with upward movable portion 34 resting upon silicon substrate 24 at upper silicon surface 54. The coils 20, which lie on upper surface 112 of inner frame 130, are fabricated in accordance with techniques known to those skilled in the art. Coils 20 include a plurality of electrically conductive windings, which are electrically isolated from adjacent windings by an insulating material. As current flows through coils 20, an electromagnetic force is generated.

Figure 6:
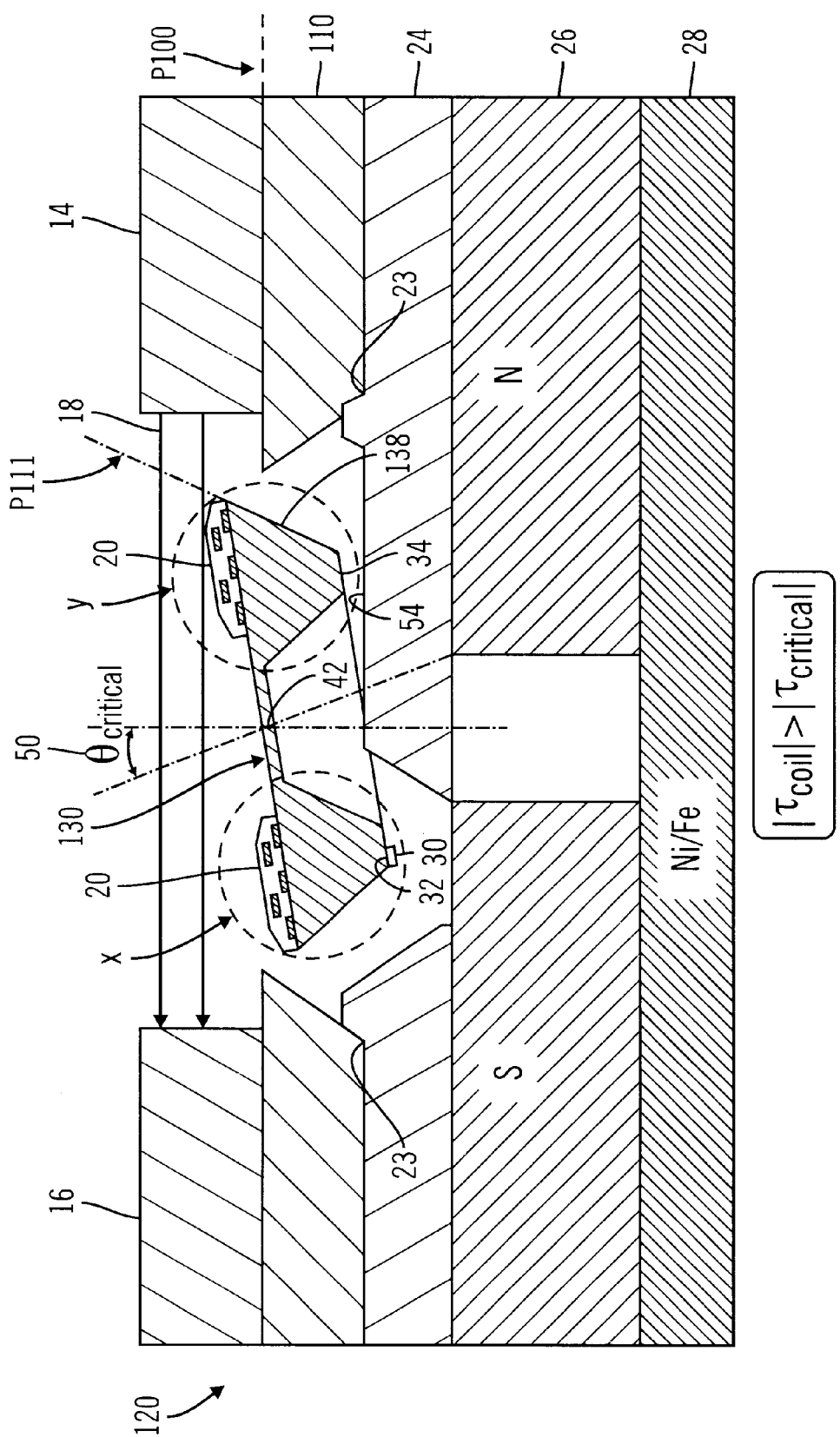
FIG. 6 is a sectional view of the opto-mechanical micro-switch of FIG. 3 rotating towards the latched position.

As the inner frame 130 begins to pivot from the "switch-off" state in FIG. 3 to the "switch-on" state as shown in FIG. 8, the inner frame 130 begins to pivot in an anti-clockwise direction under the interaction of the current and the magnetic field caused by the permanent magnet layer in the outer frame. As the inner frame begins to pivot (see FIG. 6), a reactive torque, $\tau_{beam}$, is generated from the torsion of the beams 40 and it gradually increases. On the other hand, the torque generated by the electromagnetic force caused by a constant current in the coils, $\tau_{coil}$, generally decreases with rotation of the inner frame 130 in the anti-clockwise direction (the $\tau_{coil}$ is not constant because of the change in relative position between the coils 20 and the permanent magnet 26 and the change in the direction of the component of the magnetic force attributing to torque on the inner frame). At the same time, the torque caused by the attractive force between the Permalloy piece 30 and the magnet 26, $\tau_{permalloy}$, continues to increase. In order for the inner frame 130 to be able to rotate, the following relationship must be met: $|\tau_{permalloy} + \tau_{coil}| > |\tau_{beam}|$.

Figure 7:
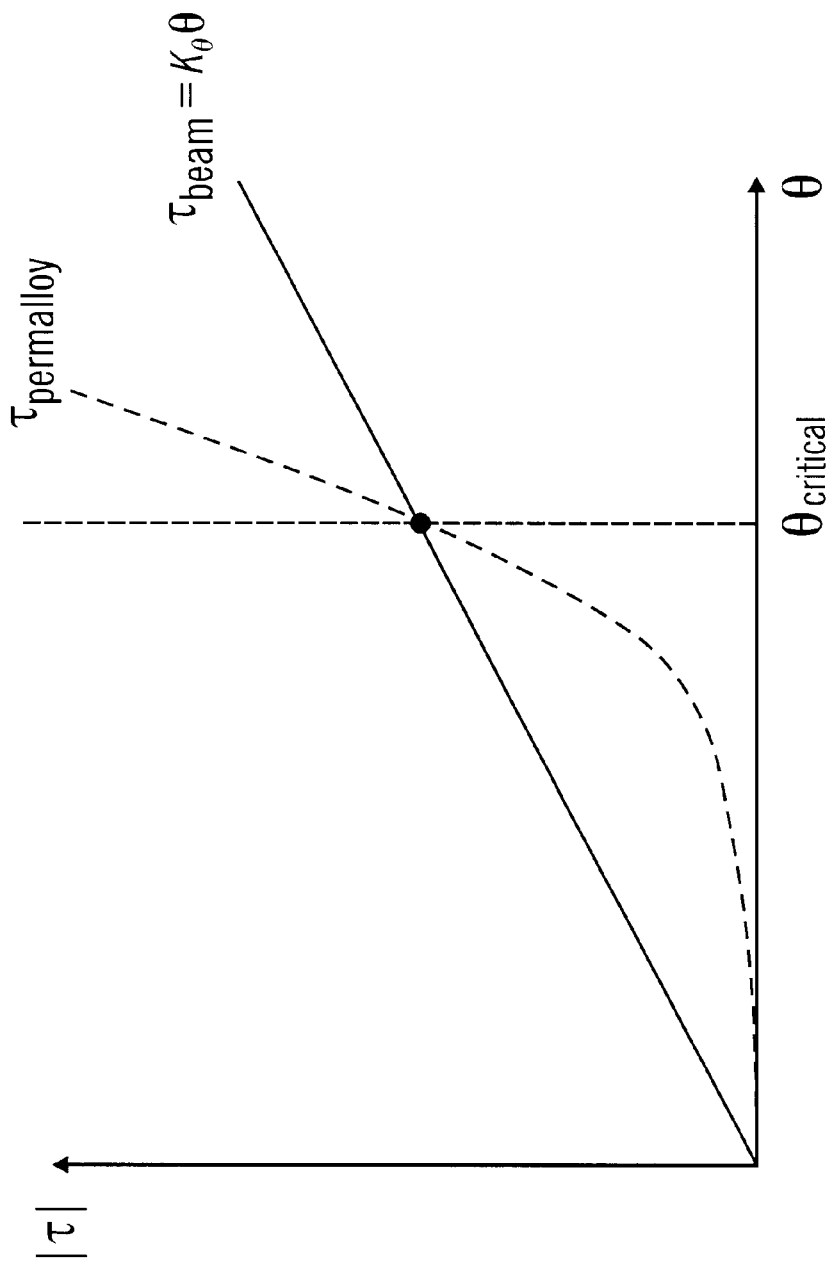
FIG. 7 is a graph showing the relationship of various static torques for switching on an opto-mechanical micro-switch according to one embodiment of the present invention.
Figure 12:
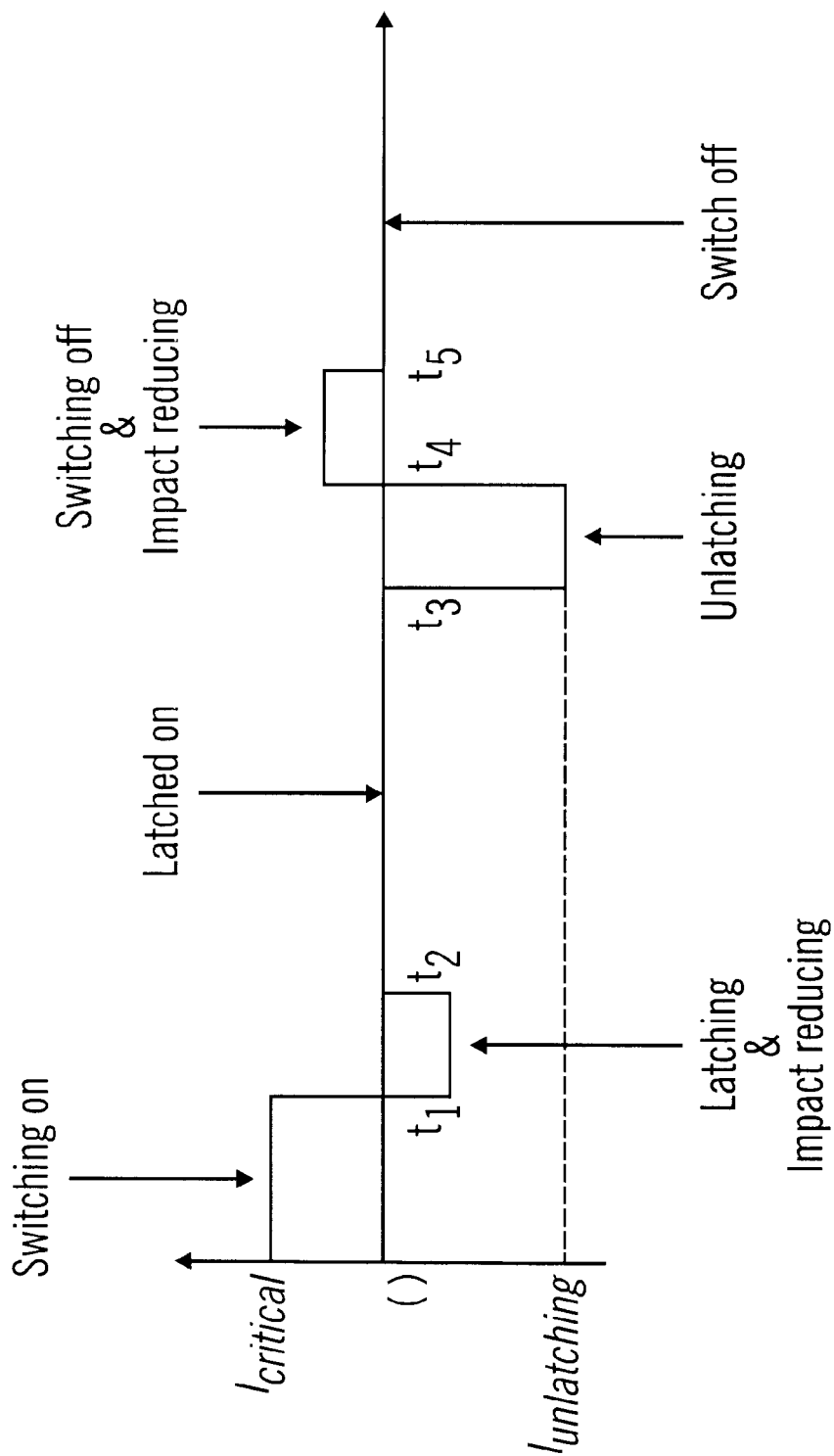
FIG. 12 is a graph showing the changes of coil actuation current during the operation of an opto-mechanical micro-switch according to one embodiment of the present invention.
Figure 18:
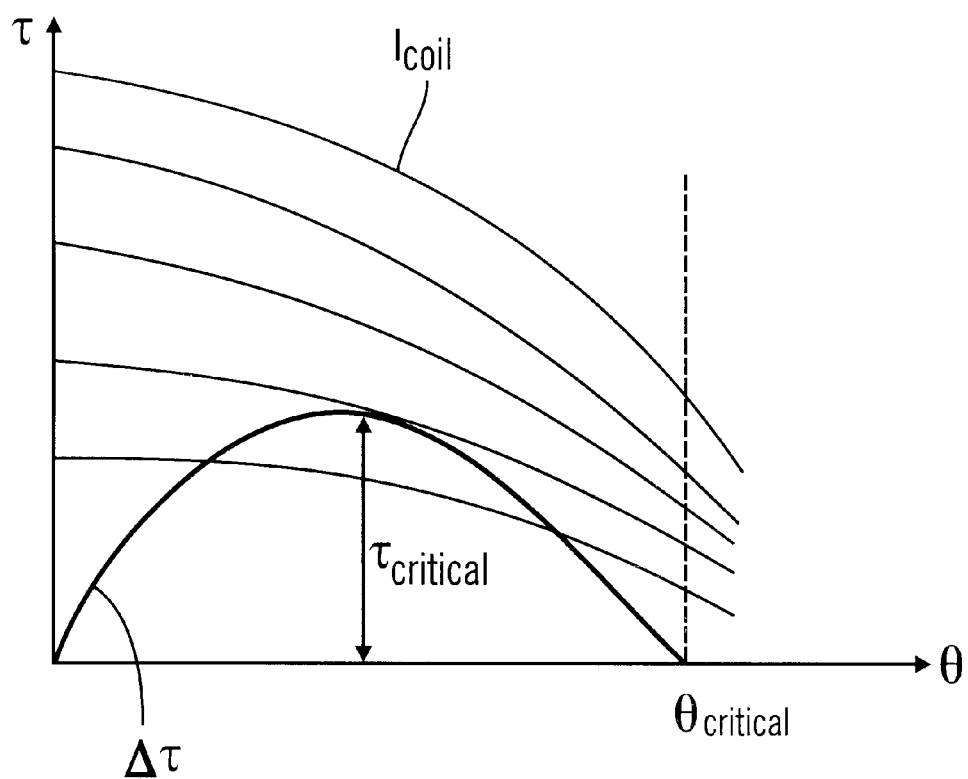
FIG. 18 is a graph showing the relationship between the critical torque and the current of the coil.

When the angle of inclination (or rotation) of the inner frame reaches a critical angle ($\theta_{critical}$), which is measured about the axis of rotation 42, $\tau_{permalloy}$ is sufficient to counteract $\tau_{beam}$ even in the absence of the current induced $\tau_{coil}$. Beyond $\theta_{critical}$, as long as $\tau_{permalloy} > \tau_{beam}$, the inner frame will continue to rotate to an upper silicon surface 54 as shown in FIG. 8, and remain in this position (i.e., latched on) in the absence of any coil current. The magnetic force from the permanent magnet layer 26 holds the Permalloy piece 30 down, against the bias of $\tau_{beam}$, thus maintaining the inner frame 130 in the latched position. $\tau_{latching}$ is the value of $\tau_{permalloy}$ at the latched position. FIG. 7 shows that after $\theta_{critical}$, $\tau_{permalloy}$ is greater than $\tau_{beam}$, thus ensuring the switching on state. FIG. 18 further shows that the current $I_{coil}$ required to ensure rotation of the inner frame lies within a range of possibilities. One can control the applied coil current to provide a changing $\tau_{coil}$ that just exceeds $\tau_{beam} - \tau_{permalloy}$ (or $\Delta\tau$) along the rotation of the inner frame from $\theta=0$ to $\theta=\theta_{critical}$. This requires more complex control, but would minimize the applied current. $\tau_{critical}$ is the greatest value of $\tau_{beam} - \tau_{permalloy}$ during rotation to $\theta_{critical}$. As long as the entire $I_{coil}$ curve lies on or above the $\Delta\tau$ curve, any of the $I_{coil}$ curves will allow the necessary current for the desired rotation of the inner frame for latching. As shown in FIG. 12, in yet another embodiment of the present invention, once the threshold $\theta_{critical}$ is passed, a reverse current of an appropriate amount may be applied through the coils in order to generate a torque ($<|\tau_{permalloy}-\tau_{beam}|$) in a clockwise direction to counter the $\tau_{permalloy}$ that is in excess of $\tau_{beam}$ and a torque attributed to the rotational momentum of the inner frame. The purpose of this reverse torque is to soften the impact when the Permalloy piece attached to the inner frame hits the outer frame.

Figure 9:
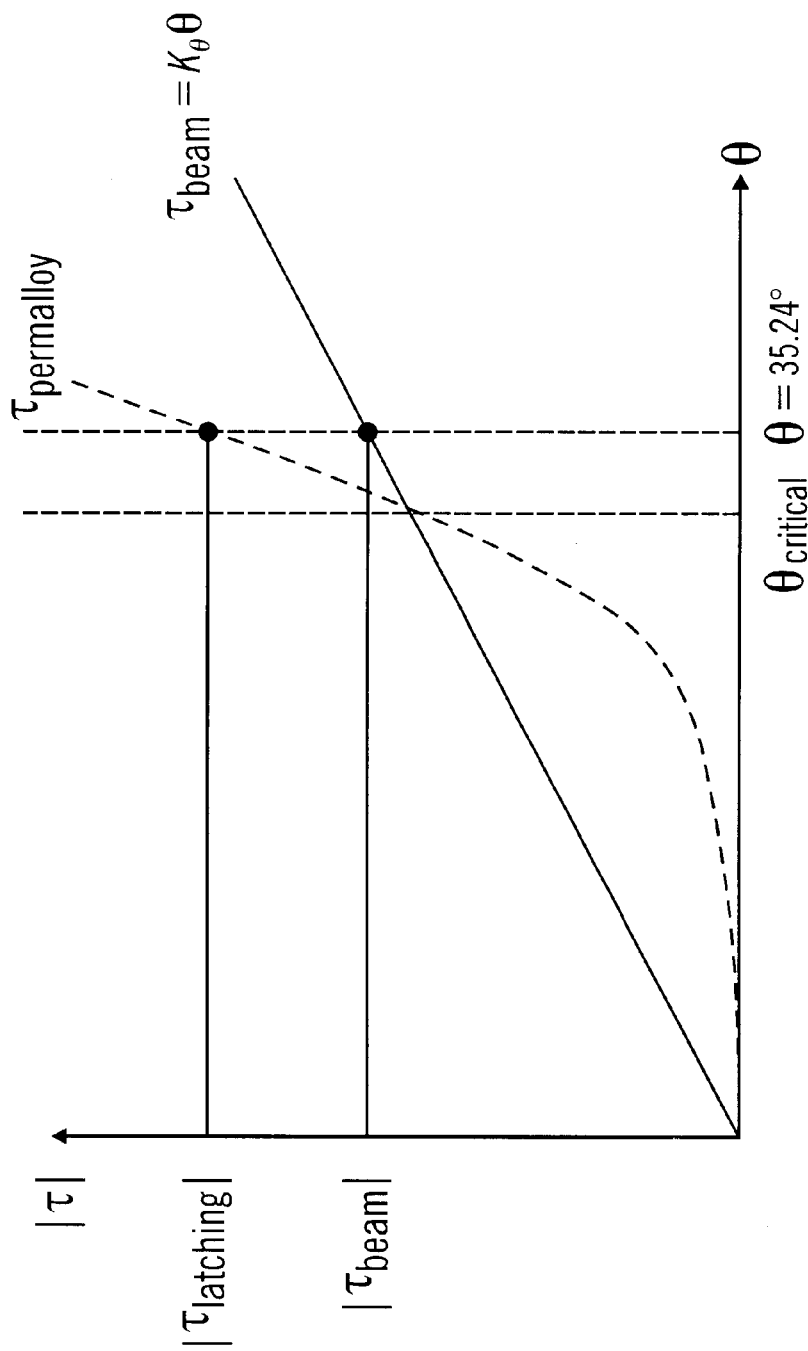
FIG. 9 is a graph showing the relationship of various static torques for latching on an opto-mechanical micro-switch according to one embodiment of the present invention.

As indicated in FIGS. 8 and 9, in one embodiment of the present invention, when the angle of inclination, θ, reaches 35.24°, the inner frame 130 is latched onto the outer frame 120 at silicon substrate 24. The value, 35.24°, is the difference of 90° and 54.76°, which is the angle of intersection of P111 of the inner frame and the upper surface 112 of the outer frame 120 when the inner frame is in its "switch off" position. At this angle of inclination, the flat surface of P111 of the inner frame 130 will form a 90° angle with the upper surface 112 of the outer frame 120. As mentioned before, even though the power is released, the magnetic force between the magnet 26 and Permalloy piece 30 maintains the latching position. As shown in FIG. 8, in this latched on position, all light from the light source 14 is reflected to receiver 15 (see FIG. 2; receiver 15 is obscured from view by light source 14 in FIG. 8) or blocked from receiver 16.

Figure 10:
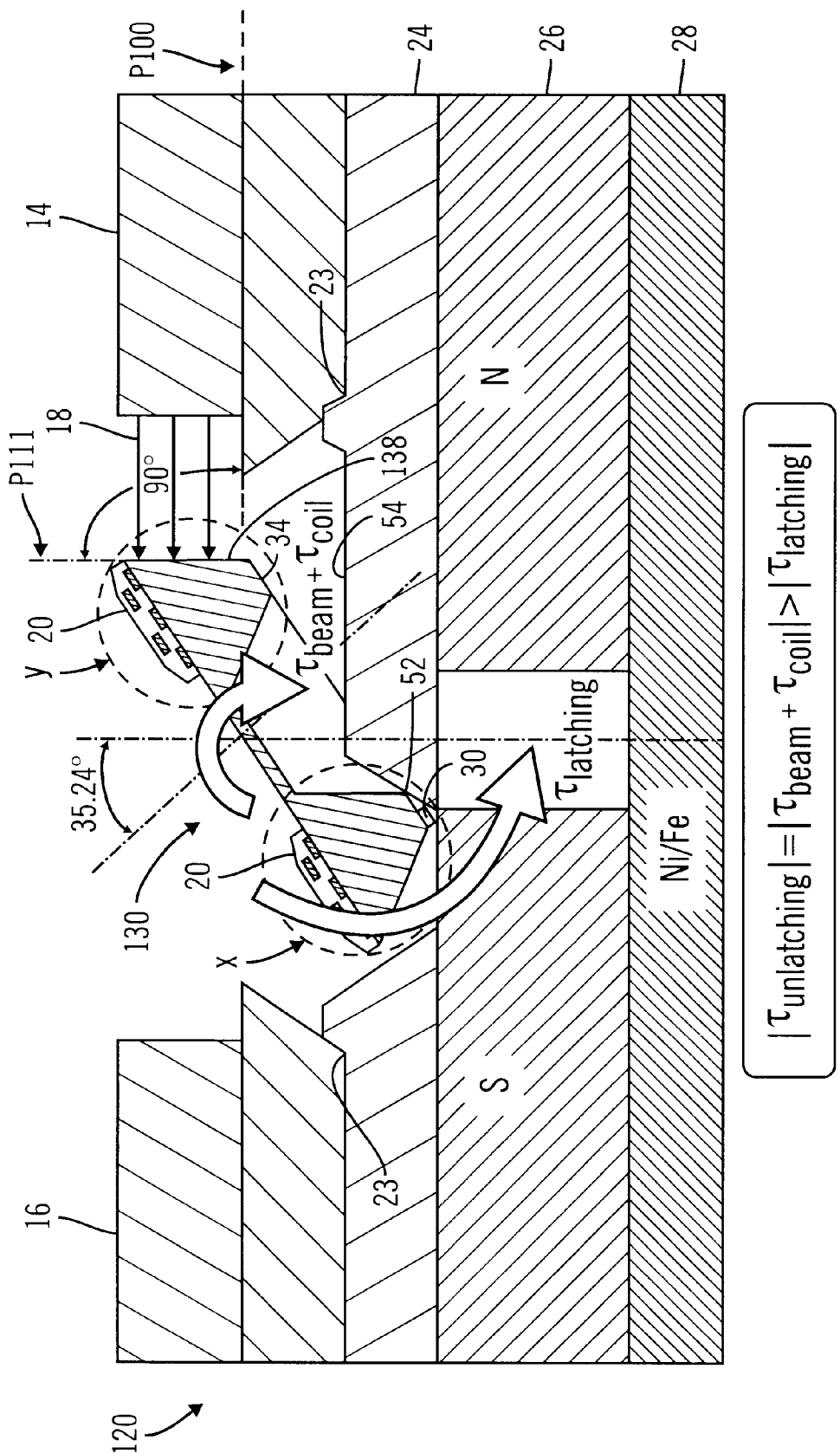
Figure 11:
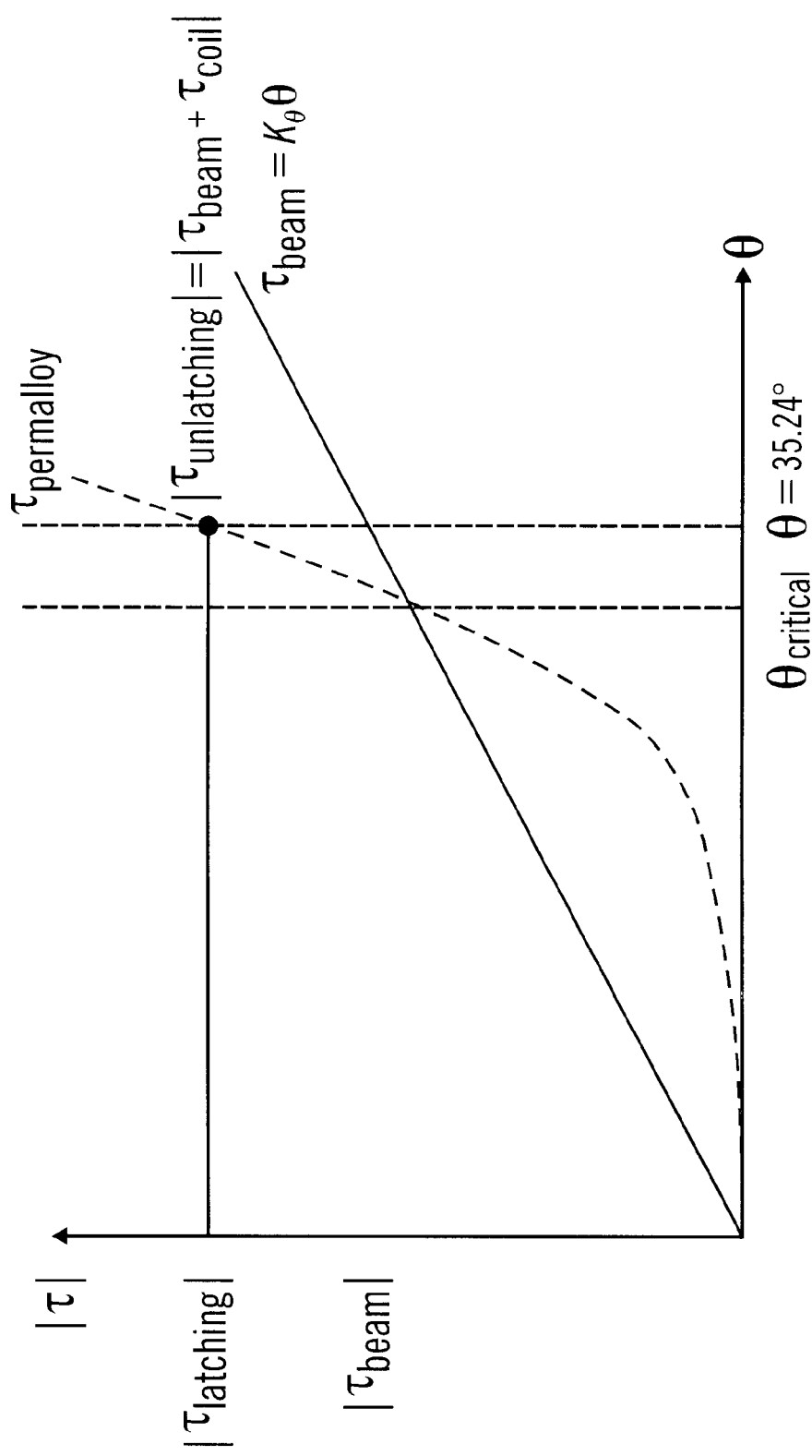
FIG. 11 is a graph showing the relationship of various static torques for unlatching an opto-mechanical micro-switch according to one embodiment of the present invention.

FIGS. 10 and 11 demonstrate the process in which the latched-on switch returns to its "off" position. When the switch is to be unlatched, power is applied so that a reverse current runs through the coils 20. As shown in FIG. 8, the latching torque in the anti-clockwise direction is the torque generated by the magnetic force between the Permalloy piece and the permanent magnet, i.e., $\tau_{latching}$. To unlatch the inner frame, two opposing torques to the latching torque come into play, the torque of the beam, $\tau_{beam}$, and the torque generated by the interaction of the reverse current through the coils 20 and the magnetic field from the permanent magnet 26, $\tau_{coil}$. As shown in FIG. 11, at the point of unlatching, $|\tau_{latching}|=|\tau_{coil}+\tau_{beam}|$ must be greater than $|\tau_{permalloy}|$ to initiate rotation of the inner frame from its latched position. $\tau_{coil}$ must be maintained such that it is greater than $|\tau_{permalloy}-\tau_{beam}|$ at all times to maintain rotation of the inner frame, until the inner frame reaches $\theta_{critical}$. If a constant reverse current is applied, $\tau_{coil}$ should be the maximum value of $|\tau_{permalloy}-\tau_{beam}|$ (i.e., at the latched position $\tau_{latching}-\tau_{beam}$ in FIG. 11) to ensure sufficient $\tau_{coil}$. If a variable current is applied, $\tau_{coil}$ may be decreased as the inner frame rotates from the latch position. (It is noted that $\theta_{critical}$ for clockwise rotation (unlatching) may be slightly different from $\theta_{critical}$ for anti-clockwise rotation (latching) because of rotational momentum of the inner frame, a dynamic component that causes hysteresis in $\theta_{critical}$ and other parameters between rotations in the two directions. The reverse current may be released once the critical angle, $\theta_{critical}$, is passed. As indicated before and as shown in FIG. 11, after this point, $\tau_{beam}$ is greater than $\tau_{permalloy}$, and thus the inner frame will continue to tilt in the anti-clockwise direction until its end Y rests on the silicon substrate 24. In yet another embodiment of the present invention, once the critical point is passed, a current of an appropriate amount is applied through the coils to generate a torque (less than $|\tau_{beam}-\tau_{permalloy}|$) in the anti-clockwise direction to counter the excessive torque of the beams and the rotational momentum of the inner frame. The purpose is to soften the impact of end Y of the inner frame when it returns to its original "off" position and rests on the silicon substrate 24 in the outer frame.

FIG. 12 further illustrates the behavior (current as a function of time) of the opto-mechanical micro-switch 300 from the "switch off" to "switch on" and then back to "switch off" states under control of the controller 99, according to one embodiment of the present invention. At time 0, the micro-switch is at the "switch off" state as illustrated in FIG. 3. A current, $I_{critical}$, is applied through the coils attached to the inner frame between t=0 and $t_1$, to rotate the inner frame from θ=0 to $\theta_{critical}$. The value of $I_{critical}$ is chosen so that the inner frame will pivot through the critical angle of inclination, $\theta_{critical}$, beyond which, as indicated above, the torque generated by the magnetic force between the Permalloy piece and the permanent magnet will overcome the reactive torque of the beam, thus allowing latching to occur with the current removed. Beyond $t_1$ and $\theta_{critical}$, a reverse current is applied through the coils to reduce the impact of the Permalloy piece onto the outer frame due to the excessive torque caused by the magnetic attraction between the Permalloy piece and the permanent magnet over the reactive torque of the beam. At time $t_2$, the inner frame reaches its "latched-on" position. At this point, no current needs to be applied through the coils. The excessive magnetic torque, $\tau_{permalloy}$, over the beam torque, $\tau_{beam}$, will keep the inner frame in place. When unlatching, a reverse current is applied, so that the sum of the unlatching torque and the beam torque must be higher than the latching magnetic torque, thereby causing the inner frame to tilt back to its original starting position. The time $t_4$ is a time where the inner frame has tilted back, slightly beyond the critical angle. Since after $t_4$, the torque of the beam is higher than the magnetic torque, the inner frame will continue to tilt toward its starting position, even without any continuous current. However, again in order to reduce the impact when the inner frame hits the upper surface 54 of the silicon substrate of the outer frame, a positive current is applied to counter the excessive torque of the beam over the magnetic torque. Impact reducing is necessary during latching to prevent the end X of the inner frame 130 from making contact with the outer frame 120 that may cause structural damage; impact reducing is also necessary during "switching off" to prevent the end Y of the inner frame 130 from hitting the upper silicon surface 54 with excess force.

Figure 13:
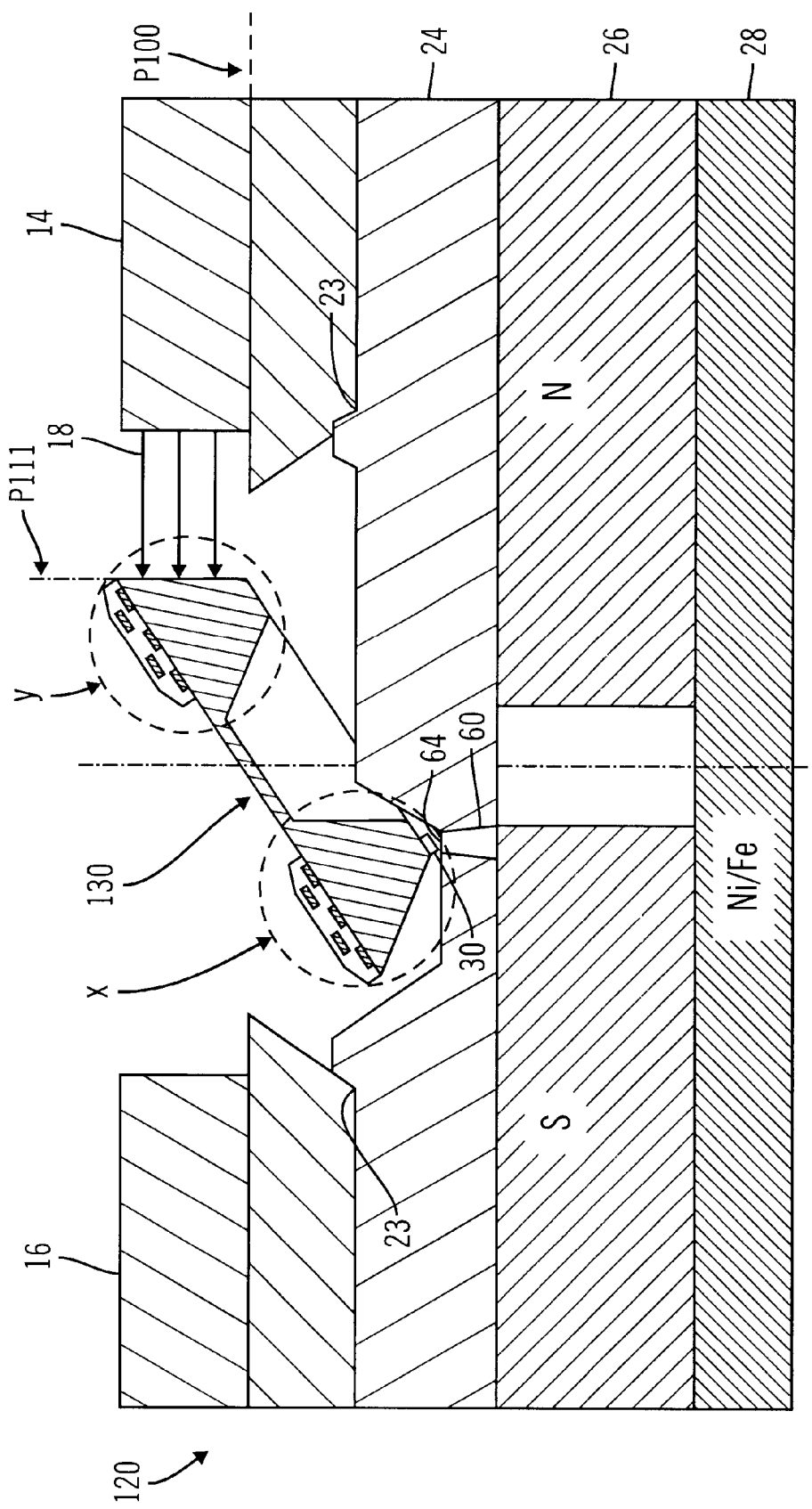
FIG. 13 is a sectional view of an opto-mechanical micro-switch with the Permalloy on the stop die at the latched on position in accordance with another embodiment of the present invention.

FIG. 13 shows yet another embodiment of the present invention. An additional Permalloy piece 60 is added to the permanent magnet 26 to focus the magnetic field against the Permalloy piece 30. In FIG. 13, the Permalloy piece 60 is incorporated within the silicon substrate 24 and placed directly on top of, or in close proximity to, the permanent magnet layer 26 to allow magnetization of the Permalloy piece 60. This arrangement increases the magnetic force on the Permalloy piece 30 by focusing the magnetic flux of layer 26 on the Permalloy piece 30, which attracts the Permalloy piece 30 towards lower stationary portion 64 and holds it in the latched on position.

Figure 14:
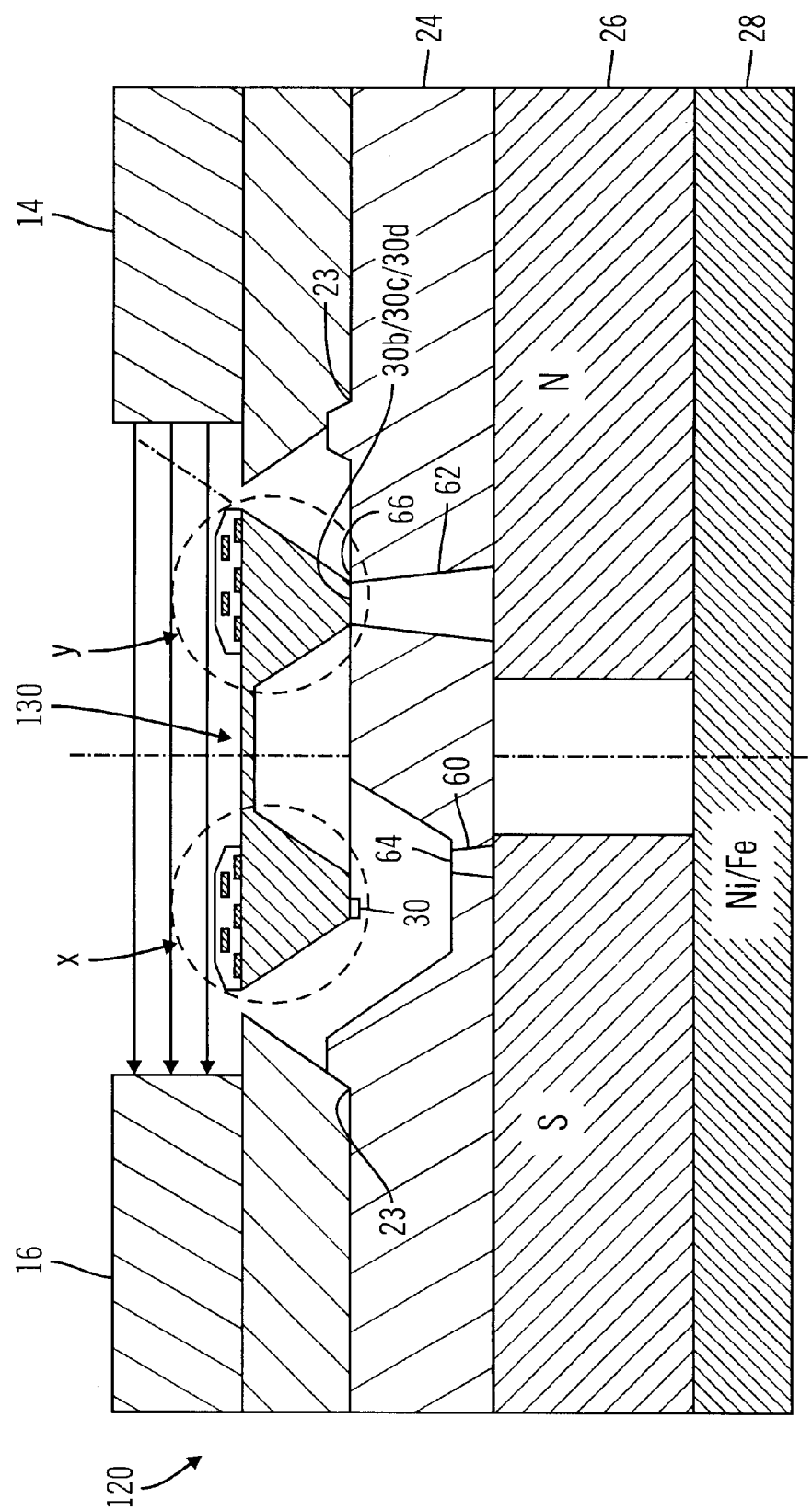
FIG. 14 is a sectional view of an opto-mechanical micro-switch with the Permalloy on the stop die at the latched off position in accordance with another embodiment of the present invention.

FIG. 14 shows yet another embodiment of the present invention. As shown in FIG. 14, a Permalloy piece 62 is added to the silicon substrate layer 24. Further, the Permalloy piece 62 is placed directly on top of, or in close proximity to, the permanent magnet layer 26, in order to allow magnetization of the Permalloy piece 62. An additional Permalloy piece 30b/30c/30d is added to the lower portion of end Y of the inner frame 130. The magnetized Permalloy piece 62 keeps the end Y of inner frame 130 attached to the upper stationary portion 66. This embodiment serves to securely hold the inner frame 130 in place in the non-biased state (switch-off) against external perturbations, and to reduce the force required to unlatch from the switch-on state.

Figure 15:
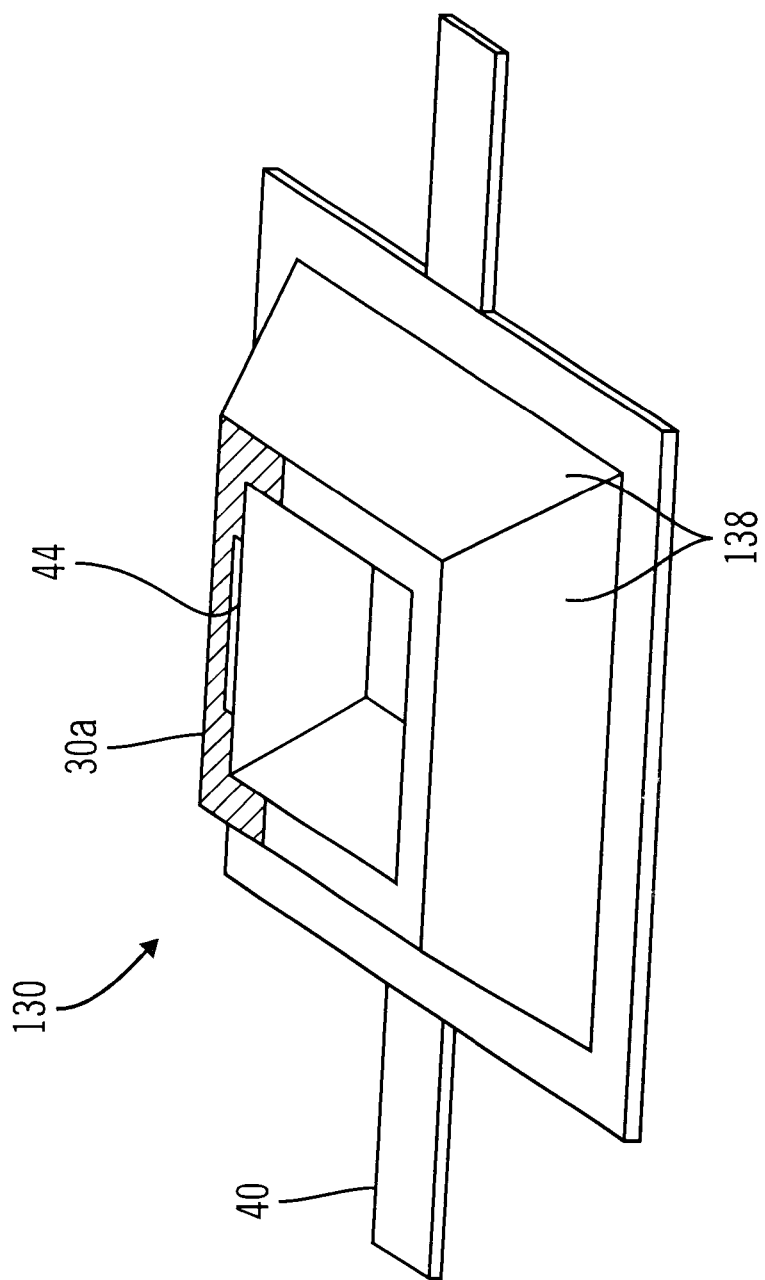
FIG. 15 is a perspective bottom view of the inner frame in FIG. 3 showing one embodiment of the present invention with Permalloy.
Figure 16:
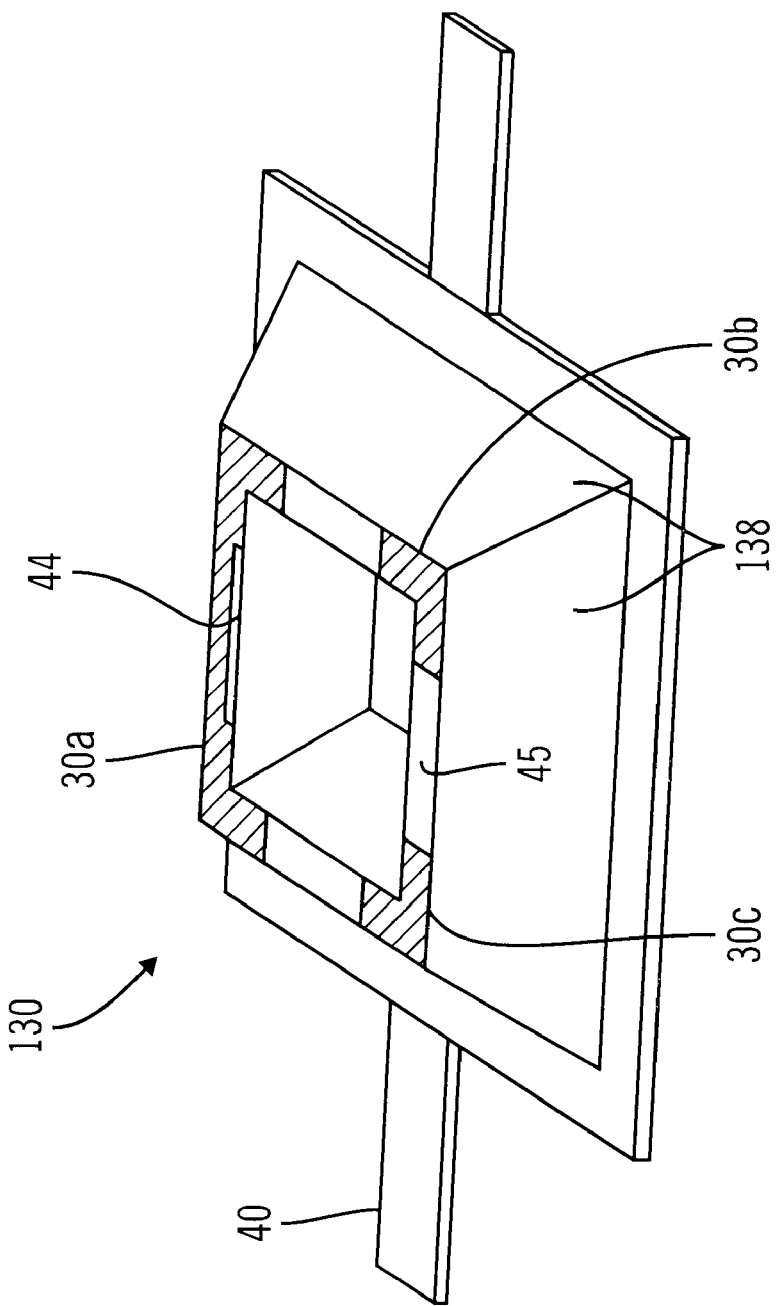
FIG. 16 is a perspective bottom view of the inner frame in FIG. 3 showing another embodiment of the present invention with Permalloys.
Figure 17:
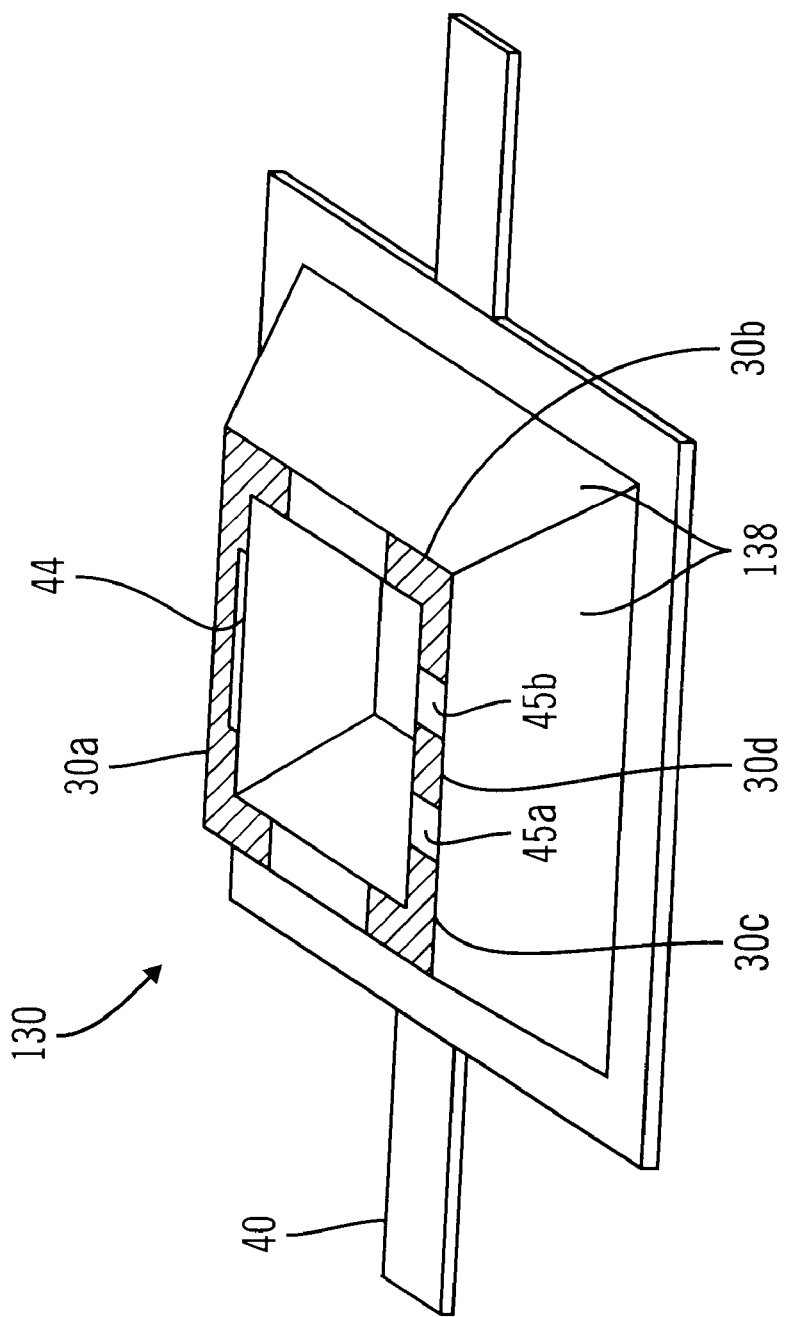
FIG. 17 is a perspective bottom view of the inner frame in FIG. 3, showing another embodiment of the present invention with Permalloys.

FIGS. 4 and 5 show two plan bottom views of inner frame 130 with different Permalloy deposit embodiments. FIG. 4 shows Permalloy 30a with a stop edge 44, which allows for silicon-to-silicon contact when the switch is on and the inner frame is latched onto the outer frame. The stop edge 44 avoids the Permalloy-to-silicon contact. The silicon-to-silicon contact prevents the constant impact of the Permalloy piece during the operations of the micro-switch. Not only does it prevent damage deformation but it also avoids stiction; a tremendous force is required for separation once there is contact. FIG. 15, a perspective bottom view of FIG. 4, shows one embodiment of the present invention with the Permalloy 30a on one side of the inner frame 130. Another embodiment of the present invention in FIG. 5 shows Permalloy 30a and stop edge 44 with the addition of Permalloys 30b and 30c at the lower corners of the inner frame 130. FIG. 16, a perspective bottom view of FIG. 5, also shows stop edge 45 in between Permalloy 30b and 30c. In yet another embodiment of the present invention, FIG. 17 shows an additional Permalloy 30d with stop edges 45a and 45b. These additional Permalloys allow for increased latching strength in another embodiment as shown in FIG. 14.

To manufacture a micromachined structure, reference is made to U.S. patent application Ser. No. 09/366,428 filed Aug. 2, 1999, assigned to Integrated Micromachines, Inc., the assignee of the present invention, which is fully incorporated by reference herein. Such patent application discloses a process that provides one skilled in the art with the steps to manufacture the following: an outer frame and an inner frame, pivotally coupled to the outer frame, which is rotatable about an axis of rotation from a first position to a second position relative to the outer frame when an external force is applied, and wherein the inner frame is biased to return to the first position in the absence of the external force, and providing a permanent magnet on the outer frame. In the present invention, the method of manufacturing a micromachined structure further includes the step of forming the Permalloy, or a magnetic material, on the inner frame.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A micromachined structure comprising:
   an outer frame;
   an inner frame pivotally coupled to the outer frame, wherein the inner frame is rotatable about an axis of rotation from a first position to a second position relative to the outer frame when an external force is applied, and wherein the inner frame is biased to return to the first position in the absence of the external force; and
   latching means for maintaining the inner frame in the second position in the absence of the external force, said latching means comprising:
   a permanent magnet on he outer frame; and
   a magnetic material on the inner frame;
   wherein the inner frame has first and second sides relative to the axis of rotation; and the outer frame has a stop against which the inner frame rests in the second position, and said magnetic material is positioned on the first side of the inner frame that is closer to the stop when the inner frame is biased to the second position.

2. A micromachined structure according to claim 1, wherein said magnetic material is positioned such that when the inner frame rotates to the second position and rests against the stop, the stop does not contact the magnetic material.

3. A micromachined structure according to claim 1, further comprising additional magnetic materials positioned on the second side of the inner frame to focus magnetic flux of the permanent magnet against the magnetic material such that the inner frame may be latched in said first position.

4. A micromachined structure according to claim 3, wherein said magnetic material is positioned such that when the inner frame rotates to the first position and rests against the stop, the stop does not contact the magnetic material.

5. A micromachined structure comprising:
   an outer frame;
   an inner frame pivotally coupled to the outer frame, wherein the inner frame is rotatable about an axis of rotation from a first position to a second position relative to the outer frame when an external force is applied, and wherein the inner frame is biased to return to the first position in the absence of the external force; and
   latching means for maintaining the inner frame in the second position in the absence of the external force, said latching means comprising:
   a permanent magnet on he outer frame;
   a magnetic material on the inner frame; and
   a magnetic material on the outer frame that is positioned closer to the first side of the inner frame to focus the magnetic flux of the permanent magnet against the magnetic material on the first side of the inner frame.

6. A micromachined structure comprising:
   an outer frame;
   an inner frame pivotally coupled to the outer frame, wherein the inner frame is rotatable about an axis of rotation from a first position to a second position relative to the outer frame when an external force is applied, and wherein the inner frame is biased to return to the first position in the absence of the external force; and
   latching means for maintaining the inner frame in the second position in the absence of the external force, said latching means comprising:
   a permanent magnet on the outer frame;
   a magnetic material on the inner frame; and
   a magnetic material on the outer frame that is positioned closer to the second side of the inner frame to focus the magnetic flux of the permanent magnet against the magnetic material on the second side of the inner frame.

* * * * *

UNITED STATES PATENT AND TRADEMARK OFFICE
CERTIFICATE OF CORRECTION

PATENT NO. : 6,542,653 B2  Page 1 of 1
DATED : April 1, 2003
INVENTOR(S) : Wu et al.

It is certified that error appears in the above-identified patent and that said Letters Patent is hereby corrected as shown below:

Column 9,
Line 14, "he" should read -- the --.

Column 10,
Line 34, "he" should read -- the --.

Signed and Sealed this

Tenth Day of June, 2003

JAMES E. ROGAN
*Director of the United States Patent and Trademark Office*